(12) United States Patent
Gong et al.

(10) Patent No.: US 8,647,038 B2
(45) Date of Patent: Feb. 11, 2014

(54) FASTENER WITH SHAVING INHIBITOR

(75) Inventors: Yongping Gong, Glenview, IL (US);
Cheryl L. Panasik, Elburn, IL (US);
Michael C. Dill, Elk Grove, IL (US);
Kenneth H. Dorman, Carol Stream, IL (US); Robert B. Fischer, Roselle, IL (US); Craig R. Scachitti, Elgin, IL (US)

(73) Assignee: Illinois Tool Works Inc., Glenview, IL (US)

( * ) Notice: Subject to any disclaimer, the term of this patent is extended or adjusted under 35 U.S.C. 154(b) by 1062 days.

(21) Appl. No.: 12/349,915

(22) Filed: Jan. 7, 2009

(65) Prior Publication Data

US 2010/0172718 A1 Jul. 8, 2010

(51) Int. Cl.
*F16B 25/02* (2006.01)
*F16B 25/00* (2006.01)

(52) U.S. Cl.
CPC ................................. *F16B 25/0084* (2013.01)
USPC .......................................... 411/386; 411/420

(58) Field of Classification Search
USPC ............ 411/386, 387.1–387.8, 417, 420, 421
See application file for complete search history.

(56) References Cited

U.S. PATENT DOCUMENTS

| | | | | |
|---|---|---|---|---|
| 1,235,626 A | | 8/1917 | Woodward | |
| 2,156,350 A | * | 5/1939 | Olson | 411/420 |
| 2,160,706 A | * | 5/1939 | Olson | 411/420 |
| 2,165,011 A | * | 7/1939 | Rosenberg | 411/420 |
| 2,232,337 A | * | 2/1941 | Meersteiner | 72/88 |
| 2,740,315 A | * | 4/1956 | Gouverneur, II | 411/417 |
| 3,044,341 A | * | 7/1962 | Stern | 411/386 |
| 3,083,609 A | * | 4/1963 | Lovisek | 411/386 |
| 3,866,509 A | * | 2/1975 | Kraus et al. | 411/437 |
| 5,667,348 A | * | 9/1997 | Chen et al. | 411/420 |
| 5,759,003 A | * | 6/1998 | Greenway et al. | 411/421 |
| 2003/0198532 A1 | | 10/2003 | Hsu | |
| 2006/0285940 A1 | | 12/2006 | Walther | |
| 2007/0269288 A1 | * | 11/2007 | Palm | 411/386 |

OTHER PUBLICATIONS

ISA/US International Search Report (2 pages) and Written Opinion (4 pages) for International Application PCT/US2009/067286, ISA mailing date Mar. 10, 2010.

* cited by examiner

*Primary Examiner* — Flemming Saether
(74) *Attorney, Agent, or Firm* — Mark Croll; Patricia Chidiac; Beem Patent Law Firm

(57) ABSTRACT

A fastener with shaving inhibitor for fastening a material such as a metal sheeting panel to a substrate such as metal or wood. The fastener has a notch angled leftwardly with respect to an axis of the fastener, the notch having a first end and a second end, a leading face and a trailing face, each face having outer edges and a common edge at their intersection. At least one of the leading and trailing faces may be substantially planar but may have other shapes, such as concave. Leftwardly angled notch with faces having outer edges may attract and then cut shavings formed from material being installed, thereby reducing the quantity and/or length of shavings, prolonging the life of the material or the structure to which the material is fastened.

8 Claims, 3 Drawing Sheets

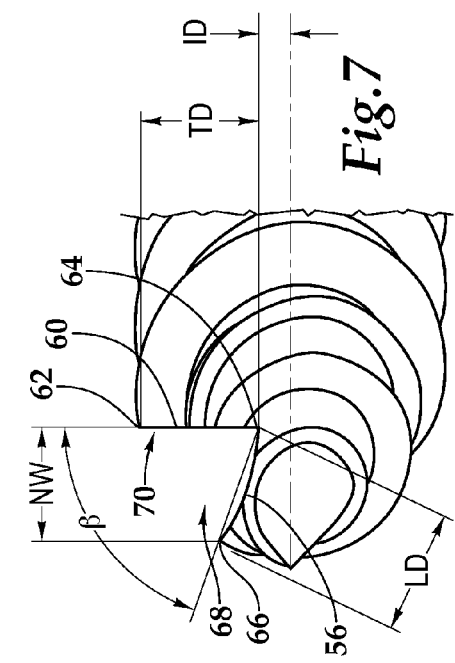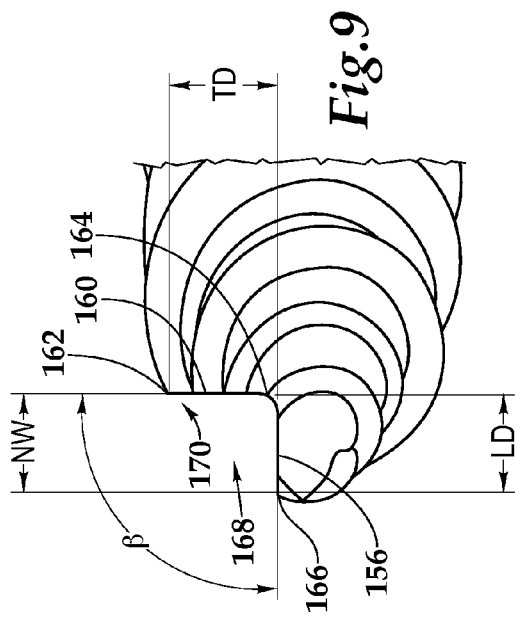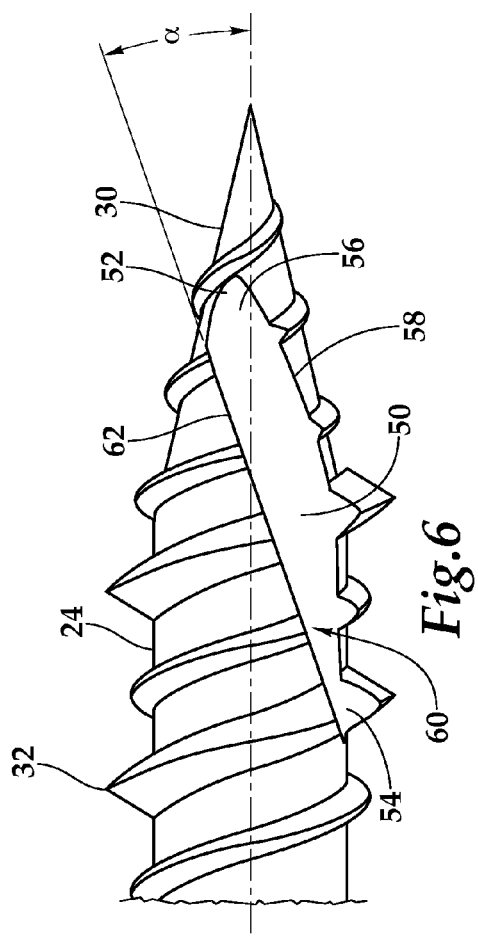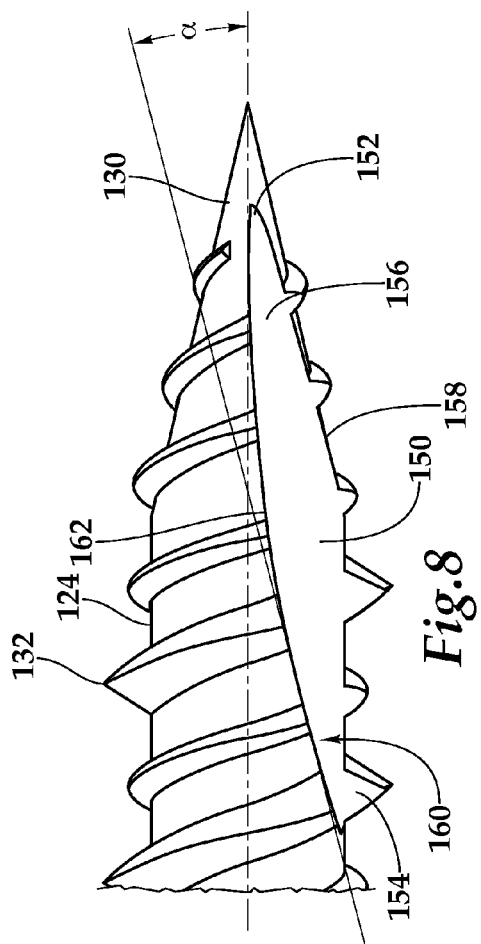

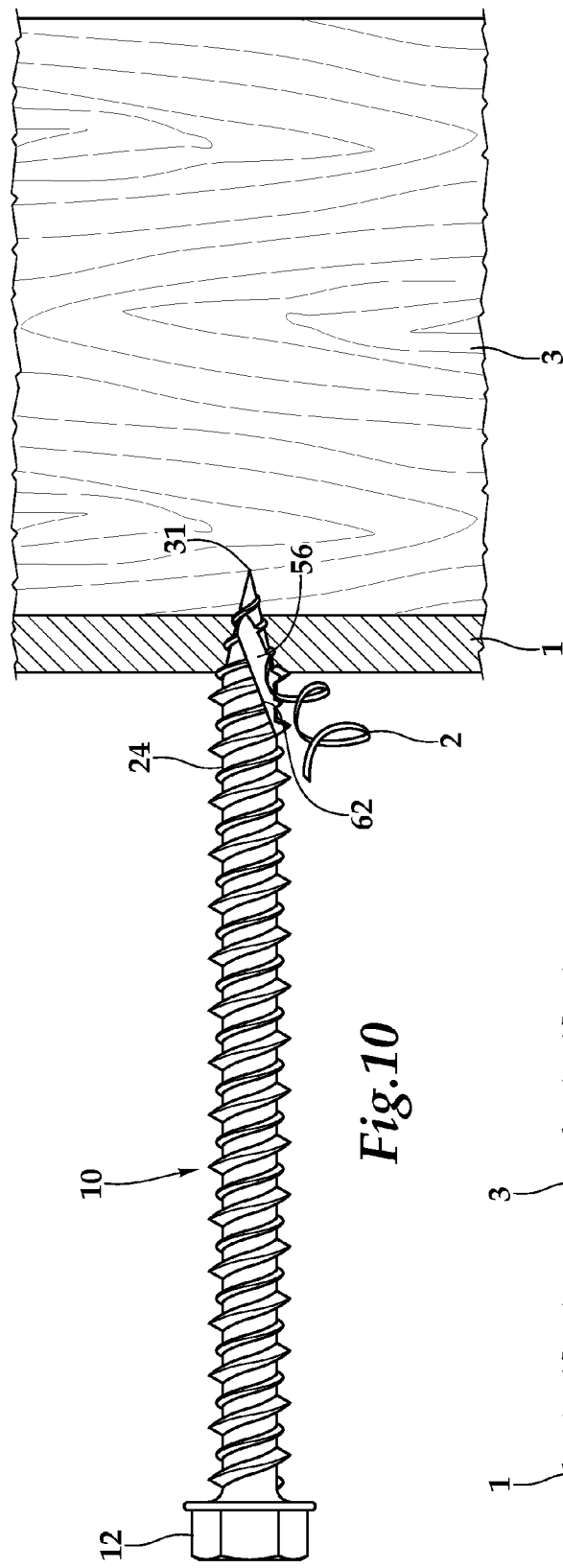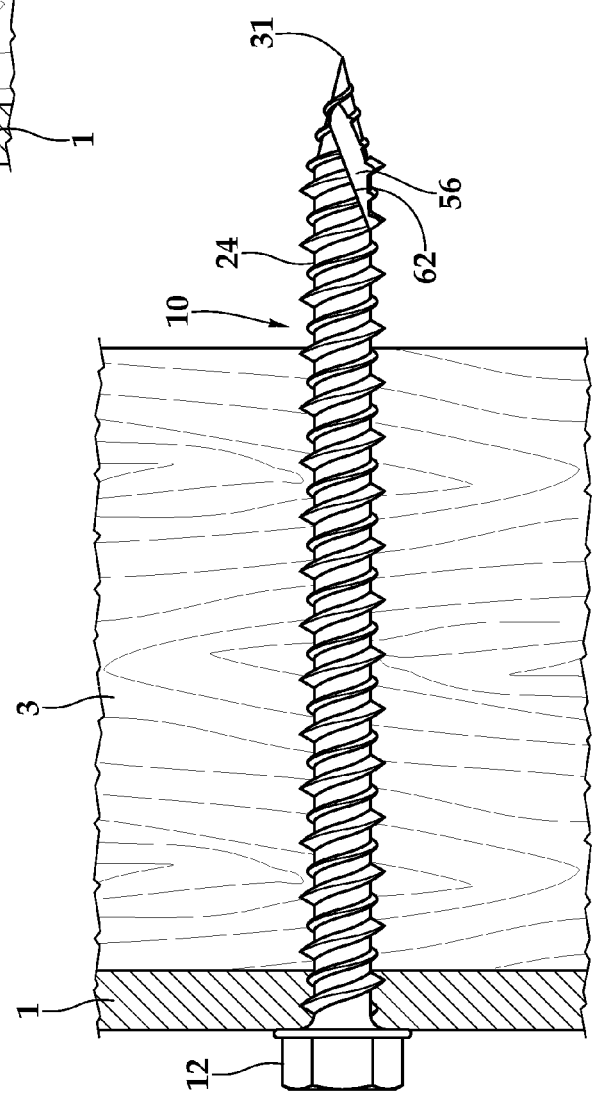

FASTENER WITH SHAVING INHIBITOR

BACKGROUND OF THE INVENTION

1. Field of the Invention

The present invention is directed to a fastener for use in applications where installation into a material may result in a shaving or shavings of the material being created. In particular, the present invention may be particularly well-suited to installation in steel or steel mounted on wood.

2. Description of the Related Art

Fasteners are routinely used to install metal panels, such as roofing panels, or to secure metal panels to wooden backings or supports. In addition, a washer such as a rubber waterproofing washer may be installed between the metal and the underside of the fastener head.

During the installation process, one or more shavings of material may be formed from the hole in the panel made by the fastener. These shavings may work their way outward and have multiple detrimental effects. For example, the shaving may abrade the panel or may enlarge the hole beyond the minimum amount necessary, removing rust barriers such as the paint that may be on the panel, which may contribute to premature corrosion of the panel. In addition, the shaving may either cut or otherwise damage the washer, or it may inhibit the washer from mounting flushly between the panel and the underside of the fastener head. In either case, this may create a leak path underneath the washer, which, in the example of a fastener located on a roofing structure, may lead to roof leaks and premature deterioration of the structure.

To alleviate this problem, in the past, an installer would expend extra labor by attempt to manually remove as many shavings as possible and/or by pre-punching holes in the panels. In addition to being time consuming, this process was limited by the fact that the installer likely would not be able to remove the entirety of each shaving since at least a portion of the shaving would have been compressed between the fastener and the substrate. As one indication of the widespread nature of this issue, during testing, a traditional gimlet-pointed fastener such as the type shown in FIG. 2 may have created shavings approximately 73% of the time during testing on 26 gauge steel panels.

Several attempts have been made to minimize the production of shavings. As seen in FIGS. 3-5, these attempts include removing portions of the fastener near the tip. For example, one proposed solution was to use a "type 17 point" fastener having a flute near the tip that consists of two sides, one side extending axially, each side extending radially and at about a 90 degree angle to one another, as seen in FIG. 3. This design slightly reduced the prevalence of shavings being formed, but only to the frequency of about 50%.

Another attempt to minimize the presence of shavings includes using a fastener having a rightwardly angled flute, such as the one shown in FIG. 4. This structure, however, is even less favorable than the gimlet-pointed fastener of FIG. 2, actually resulting in more shavings being formed, i.e., about 78% of the time during testing.

In an additional variation, an "X-point" tip, such as the one shown in FIG. 5 has been used. This X-point tip may be formed by axially offsetting two halves of a generally conical drilling tip. This arrangement results in fewer shavings being produced as compared to a traditional gimlet-pointed fastener. However, it still produces shavings about 20% of the time.

What is needed is a fastener that can be used to install materials such as steel roofing panels or steel panels mounted on wooden substrates and that reduces or minimizes the frequency of shavings being formed.

BRIEF SUMMARY OF THE INVENTION

In one embodiment, a fastener, comprising a body having a proximal end, a distal end and an axis, a head at the proximal end, a drilling tip at the distal end, a thread extending radially outwardly from the body, the thread having a first end spaced from the drilling tip and a second end spaced from an underside of the head, and a notch in the body and thread, the notch having a first end, a second end, a leading face and a trailing face, wherein the leading face and trailing face may be angled about 20 degrees leftward with respect to the axis, the second end may be spaced about $4/10$ inch from the drilling tip, the leading face is generally concave, the trailing face is generally planar, and the trailing face is generally perpendicular to a plane that is tangent to the body at an intersection of the trailing face and the body.

In another embodiment, a fastener, comprising a body having a proximal end, a distal end and an axis, a head at the proximal end, a drilling tip at the distal end, a thread extending radially outwardly from the body, the thread having a first end spaced from the drilling tip and a second end spaced from an underside of the head, and a notch in the distal end of the body and in the thread, the notch having a first end, a second end, a leading face and a trailing face, wherein the leading face and the trailing face are angled leftward with respect to the axis. Each of the leading and trailing faces, as well as the intersecting edge between the faces, may be angled substantially similarly with respect to the axis, for example, between about 10 degrees and about 30 degrees leftward with respect to said axis, preferably about 20 degrees. In addition, at least one of the leading and trailing faces may be generally planar, although the leading face may be concave. Moreover, when the fastener is installed in a substrate, the leading face may direct a shaving formed from the substrate into the notch, and an outer edge of the trailing face may cut the shaving away from the substrate.

These and other features and advantages are evident from the following description of the present invention, with reference to the accompanying drawings.

BRIEF DESCRIPTION OF THE SEVERAL VIEWS OF THE DRAWINGS

FIG. 6 is an enlarged front view of a portion of the fastener of FIG. 1.

FIG. 7 is an enlarged section view of a portion of the fastener of FIG. 1.

FIG. 8 is an enlarged front view of a portion of a second embodiment of the inventive fastener.

FIG. 9 is an enlarged section view of a portion of the fastener of FIG. 8.

FIG. 10 is a depiction of the fastener of FIG. 1 entering a steel member overlying a substrate.

FIG. 11 is a depiction of the fastener of FIG. 10 fully engaged with the steel member and substrate.

DETAILED DESCRIPTION OF THE INVENTION

Figure 1:
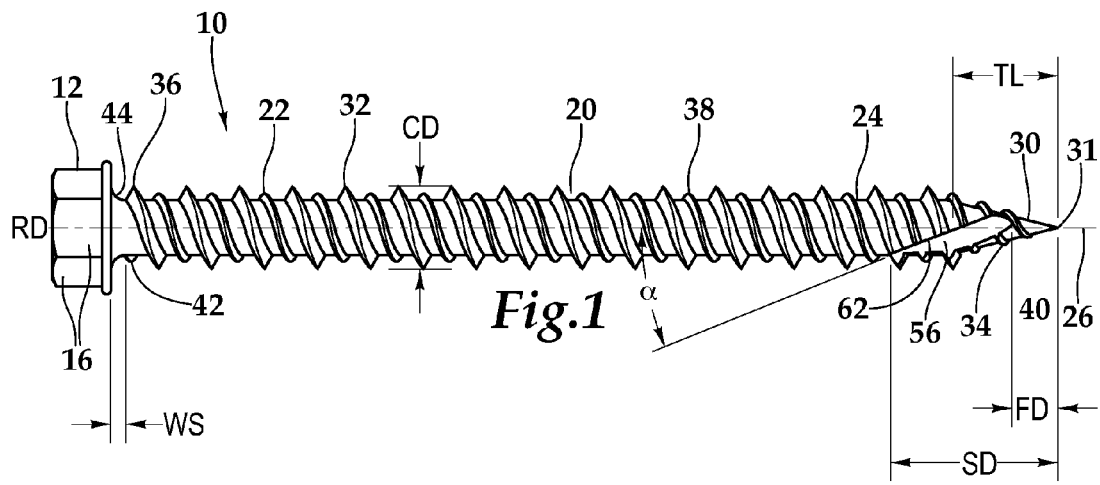
FIG. 1 is a front view of one embodiment of the inventive fastener.
Figure 2:
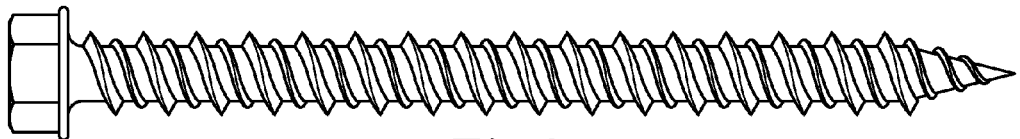
FIG. 2 is a prior art, gimlet-point tipped fastener.
Figure 3:
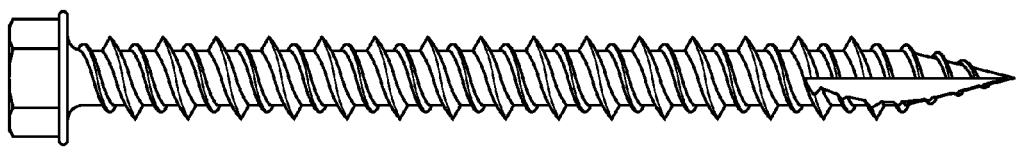
FIG. 3 is a prior art fastener employing a Type 17 point.
Figure 4:
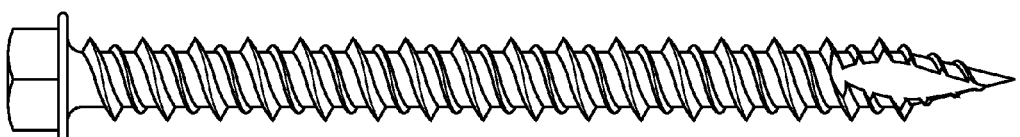
FIG. 4 is a prior art fastener employing a rightwardly facing flute.
Figure 5:
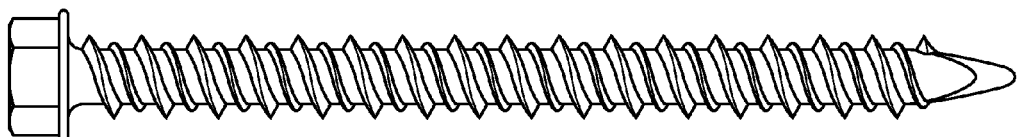
FIG. 5 is a prior art fastener employing an "X-point" tip.

Referring to FIGS. 1 and 6-9, several embodiments of a novel fastener 10 are shown. Fastener 10 is for use in a material 1, such as steel, mounted on a member or substrate, such as a wooden substrate 3. Steel may be between, e.g., about 30 gauge and about 22 gauge, or between about 0.012 inches and about 0.03 inches. Fastener 10 has features to discourage and interrupt the formation of long shavings 2 when fastener 10 is being installed into and/or through the metal 1 and/or metal 1 and substrate 3. This may be particularly useful when a long shaving 2 would be detrimental to the assembly and life of an assembly or building that is being constructed.

The novel fastener 10 has an elongated body 20 with an axis 26, an enlarged head 12 having torque transmitting surfaces 16 disposed thereon, a proximal end 22 proximate head 12, a distal end 24, and a drilling tip 30 proximate distal end 24, generally opposite head 12 and having a length TL. Body 20 has a threaded exterior such as threading 32 having a crest diameter CD and a root diameter RD, wherein threading 32 may extend from a first end 34 proximate distal end 24 to a second end 36 proximate proximal end 12. Fastener 10 may further include an unthreaded portion 44 having a length WS between an underside 14 of head 12 and second end 36 of thread 32. In addition, fastener 10 may include a second thread 38 having a first end 40 and a second end 42, wherein first end 40 of second thread 38 is proximate first end 34 of thread 32 and second end 42 of second thread 38 is proximate second end 36 of thread 32. Preferably, thread 32 and second thread 38 have substantially similar pitches such that second thread 38 winds around body 20 in between turns of thread 32.

Fastener 10 may have a notch 50 on drilling tip 30 and/or distal end 24. Preferably, notch 50 is angled leftward with respect to axis 26 to shorten, reduce or substantially eliminate shavings 2 formed when fastener 10 is driven into steel 1. Notch 50 may have a first end 52 and second end 54 and may include a leading face 56 and a trailing face 60. First end 52 may be located on drilling tip 30, and in one embodiment may be spaced about 0.02 inches from end 31 of drilling tip 30. Notch 50 may also be on drilling tip 30, but preferably notch 50 is longer than drilling tip 30 such that second end 54 may be located on distal end 24. In this manner, the hole formed in steel 1 may be at its substantially widest before second end 54 of notch 50 passes through steel 1, which means that no additional shaving or only minimal, small shavings may be formed after shaving 2 is removed by cutter 70. Alternatively, fastener 10 may have a plurality of notches spaced axially and/or circumferentially along a length of fastener 10.

Leading face 56 may have an outer edge 58, trailing face 60 may have an outer edge 62, and notch 50 may further include an edge or intersection 64 of the leading and trailing faces 56, 60. Leading face 56 and trailing face 60 may be offset from each other so as to form an angle β between them. Preferably, β may be between about 30 degrees and about 120 degrees, more preferably between about 45 degrees and about 90 degrees.

Intersection 64 may be generally collinear with axis 26 or may be spaced from axis 26 a distance ID. Preferably, ID may be between about 0 and about RD/4, which may allow notch 50 to be deep enough to admit more of shaving 2 prior to shaving 2 being cut off.

Notch 50 may comprise a shaving director 66 to guide or force shaving 2 into notch to prepare to be cut. Notch 50 may further have a shaving attractor or entrance 68 through which shaving 2 may pass as shaving 2 passes director 66. Entrance 68 may also provide clearance for shaving 2 to enter notch 50 as shaving 2 is formed. In addition, notch 50 may comprise a shaving cutter 70 to remove or detach shaving 2 from steel 1 or other material through which fastener 10 is driven as shaving 2 is formed.

Leading face 56 and trailing face 60 may each have a depth, LD and TD, respectively. As seen in FIGS. 6-7, trailing face 60 may be substantially planar and leading face 56 may be concave. In another embodiment, as shown in FIGS. 8-9, leading face 156 may be substantially planar and trailing face 160 may be concave. In this second embodiment, 100s prefixes are used to identify similar features in the embodiment of FIGS. 6-7. In addition, other combinations of planar and concave faces are within the scope of the invention.

Turning to FIGS. 1 and 6, trailing face 60 and, particularly, outer edge 62 may be angled leftward with respect to axis 26 to form an angle α between axis 26 and outer edge 62. Angle α may be between about 0 degrees and about 45 degrees, and in one embodiment, as seen in FIGS. 1 and 6, α is about 20 degrees. Outer edge 58 of leading face 56 may form a similar angle with respect to axis 26 when measured proximate first end 52 of notch 50. This slot or notch angle may position a cutting edge of fastener such as outer edge 62 in an optimum direction to cut shavings 2.

In another embodiment, as seen in FIG. 8 where trailing face 160 is concave, α may be about 15 degrees when measured at outer edge 62 proximate second end 154 of notch 150. In addition, outer edge 158 of leading face 156 may form a similar angle with respect to axis 126.

The use of fastener 10 with leftwardly angled notch 50 may reduce labor costs by reducing the time an installer may take to remove or sweep away shavings 2 in order to reduce an opportunity for rust or other corrosion in material 1 caused by the exposed material of the shaving 2. In addition, fastener 10 may reduce the probability of roof leaks by eliminating leak paths and may further reduce the probability of roof leaks by reducing the occurrence of torn or otherwise damaged waterproofing fastener washers. In contrast to the prior art fasteners described above, fastener 10 surprisingly may reduce the occurrence of shavings 2 to a frequency of about 10% or less.

An exemplary fastener 10 of the type shown in FIGS. 1 and 6-7 may have the following dimensions. Fastener 10 may be between about 1 inch and about 3 inches long, preferably between about 1½ inches and about 2½ inches long, and in one embodiment about 2⅜ inches long. Fastener 10 may have a crest diameter CD of between about ⅛ inch and about ⅜ inch, preferably between about ⅛ inch and about ¼ inch, and in one embodiment about 3/16 inches. Fastener 10 may also have a root diameter RD of between about 1/16 inch and about 3/16 inches, and in one embodiment, about ⅛ inch.

Notch 50 may be sized and oriented so as to more effectively attract, cut and remove shavings 2 than fasteners having other features. Notch 50 may have a first end 52 depth FD between about 1/16 inch and about ⅛ inch from tip 31, and in one embodiment about 0.08 inches from tip 31, a second end 54 between about ¼ inch and about ½ from tip 31, and in one embodiment about 0.4 inches from tip 31. Fastener 10 may further have a distance ID of between about 0 inches and about 1/32 inch from intersection 64 and axis 26, and in one embodiment about 0.02 inches from intersection 64 and axis 26. In addition, notch 50 may have a maximum width NW between outer edge 58 of leading face 56 and outer edge 62 of trailing face 60, forming shaving attractor or entrance 68, of about 0.065 inches. Moreover, outer edge 62 of trailing face 60 may form an angle of about 20 degrees with respect to axis 26.

These dimensions are exemplary, and other dimensions or embodiments may be within the scope of the invention. In addition, while dimensions have been provided, these dimensions may also be used to calculate proportions between elements of fastener 10 in order to modify fastener 10 and notch 50 for an intended purporse. Moreover, notch 50 may be used on various types of fasteners 10 having varied thread forms, which is beneficial as different types of fasteners may be employed for different applications.

Notch 50 may be formed in a number of ways. For example, notch 50 is preferably formed by milling fastener 10 using a milling cutter, which may allow for the formation of sharper corners at outer edge 58 of leading face 56, intersection 64 and, preferably, at outer edge 62 of trailing face 60, which may serve as shaving cutter 70.

While the foregoing written description of the invention enables one of ordinary skill to make and use what is considered presently to be the best mode thereof, those of ordinary skill will understand and appreciate the existence of variations, combinations, and equivalents of the specific exemplary embodiments and methods herein. The invention should therefore not be limited by the above described embodiments and methods, but by all embodiments and methods within the scope and spirit of the invention as claimed.

What is claimed is:

1. A fastener, comprising:
a body having a proximal end, a distal end and an axis,
a head at said proximal end,
a drilling tip proximate said distal end, said drilling tip forming a first angle with respect to said axis,
a thread extending radially outwardly from said body, said thread having a first end spaced from said drilling tip and a second end spaced from an underside of said head, and
a notch in said body and said thread, said notch having a first end located on said drilling tip, a second end located on said body, a leading face and a trailing face, and an edge at an intersection of said leading face and said trailing face;
wherein said edge is angled about 20 degrees leftward with respect to said axis and is angled a different amount than said first angle of said drilling tip, said first end of said notch is spaced between about 1/16" and about 1/8" from said end of said drilling tip, said second end of said notch is spaced about 4/10 inch from said end of said drilling tip, said leading face is generally concave, said trailing face is generally planar, and said trailing face is generally perpendicular to a plane that is tangent to said body at an intersection of said trailing face and said body.

2. A fastener, comprising:
a body having a proximal end, a distal end and an axis,
a head at said proximal end,
a drilling tip proximate said distal end,
a thread extending radially outwardly from said body, said thread having a first end spaced from said drilling tip and a second end spaced from an underside of said head, and
a notch in said distal end of said body and in said thread, said notch having a first end located on said drilling tip an spaced from said end of said drilling tip, a second end spaced from said first end and located on said body, a leading face and a trailing face with an edge at an intersection of said leading face and said trailing face, wherein said first end of said notch is disposed on said leading face, between said end of said drilling tip and a distal end of said edge, wherein said leading face and said trailing face are angled leftward with respect to said axis; and wherein one of said leading face and said trailing face is generally planar and one of said leading face and said trailing face is generally concave.

3. A fastener according to claim 2, wherein each of said leading face and said trailing face is angled proximate said second end of said notch between about 10 degrees and about 30 degrees leftward with respect to said axis when viewed from said distal end to said proximal end.

4. A fastener according to claim 3, wherein each of said leading face and said trailing face is angled proximate said second end of said notch about 20 degrees with respect to said axis when viewed from said distal end to said proximal end.

5. A fastener according to claim 2, wherein said leading face and said trailing face intersect at an edge, said edge angled leftward proximate said second end of said notch with respect to said axis when viewed from said distal end to said proximal end.

6. A fastener according to claim 5, wherein said leading face, said trailing face and said edge are substantially similarly angled leftward with respect to said axis.

7. A fastener according to claim 5, wherein said leading face is concave.

8. A fastener according to claim 2, wherein when said fastener is installed in a substrate, said leading face directs a shaving formed from said substrate into said notch and an outer edge of said trailing face cuts said shaving away from said substrate.

* * * * *